United States Patent [19]

Grantland et al.

[11] 4,309,573
[45] Jan. 5, 1982

[54] LOUDSPEAKING SUBSTATION CIRCUIT

[75] Inventors: Gary Grantland, Hartselle; Larry A. Woodworth, Huntsville, both of Ala.

[73] Assignee: GTE Automatic Electric Labs Inc., Northlake, Ill.

[21] Appl. No.: 137,702

[22] Filed: Apr. 7, 1980

[51] Int. Cl.³ .............................................. H04M 1/60
[52] U.S. Cl. .................................. 179/81 B; 179/1 HF
[58] Field of Search ................ 179/1 H, 1 HF, 1 VC, 179/1 SW, 37, 38, 81 B, 99 A, 100 L

[56] References Cited

U.S. PATENT DOCUMENTS 3,662,118  5/1972  Phoenix et al. .................. 179/81 B
3,881,069  4/1975  Ichikawa et al. ................. 179/81 B

*Primary Examiner*—Bernard Konick
*Assistant Examiner*—J. A. Popek
*Attorney, Agent, or Firm*—Robert J. Black; Anthony Miologos

[57] ABSTRACT

An improved loudspeaking substation circuit employing a dual-tone multi-frequency signal generator wherein output tone levels are regulated by the substation transmission circuit when operating in either a loudspeaker or handset mode. The circuit further provides for preventing acoustic feedback and self-oscillation between the loudspeaker and handset transmitter while transferring between either mode.

5 Claims, 1 Drawing Figure

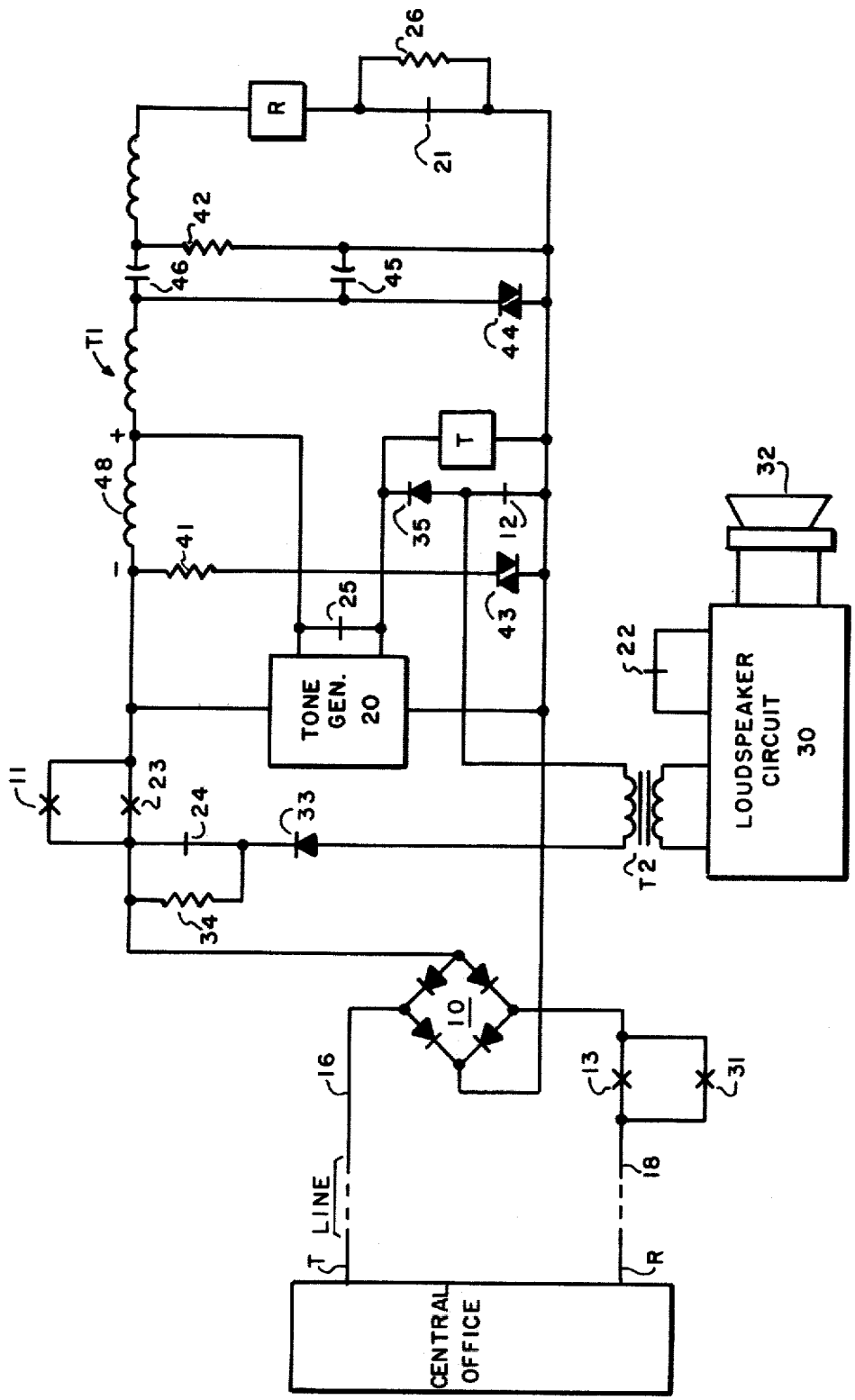

LOUDSPEAKING SUBSTATION CIRCUIT

BACKGROUND OF THE INVENTION (1) Field of the Invention

The invention relates in general to loudspeaking substation systems and more particularly to loudspeaking substation instruments employing dual tone multi-frequency oscillators for dial signalling.

(2) Description of the Prior Art

Loudspeaking substation instruments, generally referred to as speakerphones are arranged both for "distant-talking" by means of a microphone and loudspeaker and regular or "close-range" communication by means of a handset transmitter and receiver.

Earlier models speakerphones, incorporating dual tone multi-frequency (DTMF) harmonic oscillators for dial signalling use a transmission network for tone regulation, as a function of loop length, in the handset mode and a separate stand-alone network for tone regulation in the speaker mode. The separate network consists of a resistor and varistor combination placed across the telephone line only during the signalling operation. This was accomplished by hookswitch contacts which electrically shorted the unused network.

Besides the obvious drawback of increased component count with the above mentioned arrangement, the output tone levels between the handset mode and the speaker mode differed due to the differences of separate loop regulating networks.

Accordingly, it becomes an object of the present invention to provide an improved speakerphone circuit which negates the requirement for a separate speaker mode loop compensation circuit for tone regulation when employing a DTMF dial signalling device.

SUMMARY OF THE INVENTION

In accomplishing the object of the present invention there is provided an improved loudspeaking substation circuit interfacing an integrated circuit DTMF tone signalling generator to a loudspeaker circuit in such a way as to allow use of a common transmission network in both the handset and the speaker modes. The DTMF tone signal generator is designed to utilize the transmission network for loop current regulation.

The circuit incorporates hookswitch activated contacts which place the transmission network in parallel with the loudspeaker circuit when unoperated (on-hook) and the handset to the transmission network when operated (off-hook). Additionally, the hookswitch contacts place the unused mode in an electrically open condition when in a non-signalling condition, such as, when voice signals are transmitted and received. A further included combination of common switch contacts and polarity steering diodes insure that the transmission circuit is always connected during the DTMF signalling operation regardless of the selected speaker or handset mode.

The hookswitch contacts which transfer from the handset mode to the speaker mode must be make-before-break to prevent a momentary open loop condition. The transfer time while both modes are simultaneously active creates an acoustic feedback condition, or self-oscillation, between the handset transmitter and the loudspeaker. To correct this problem, a diode is connected across the handset transmitter. The diode becomes forward biased during the simultaneous active time when both the speaker and the handset are connected to the transmission circuit. Thus, shunting current around the handset transmitter and preventing oscillation. During the normal handset mode, the diode is reverse biased and is transparent to the circuitry.

During long loop conditions, in the handset mode, voltage across the telephone circuit becomes deficient with respect to the peak-to-peak voice output signal of the speaker circuit. To overcome this difference of voltage, a second diode has been connected in series with the speaker circuit thus maintaining the reverse bias integrity of the first diode.

The use of diodes combined with the respective contact switching arrangement reduces the overall contact requirement for the speakerphone. This also allows use of the transmission network as a regulating element during the DTMF signalling operation regardless of which mode of operation the speakerphone is in at the time.

DESCRIPTION OF THE DRAWING

The single sheet of drawings included herewith comprise a schematic diagram of the improved loudspeaking substation circuit embodying the principles of operation of the present invention.

DESCRIPTION OF THE PREFERRED EMBODIMENT

The included drawing schematically shows the improved loudspeaking telephone circuit and those elements well known and common to a loudspeaking subscriber station which will be hereinafter described in detail.

A loudspeaking subscriber station handset transmission circuit including transformer T1, transmitter T, receiver R and line balancing network comprised of resistors 41, 42, varistors 43, 44 and capacitors 45, 46 are connected to a diode bridge network 10 via hookswitch contact 11. The transmission circuit further includes an integrated circuit dual-tone multi-frequency (DTMF) signalling generator 20 connected in parallel to the transmission circuit. The signalling generator which includes a DTMF oscillator is matched to the impedance of the transmission circuit and designed to utilize the transmission mission circuit for loop current and tone level regulation of its output signalling tones. The tone generator 20 further includes a pile-up of common switch contacts including contacts 21, 23, and 25 which operate when the tone generator is operated, Diode bridge 10 connects the transmission circuit to a central office and a central office battery (not shown) via subscriber station leads 16 and 18 to the tip and ring leads respectively of a subscriber line. Lead 18 includes a hookswitch contact 13 which is arranged to complete a loop circuit from the central office and central office battery, to the subscriber line and the transmission circuit. Providing battery current from the central office to the subscriber station and signalling tones from the subscriber station to the central office.

The improvement in the loudspeaking telephone circuit described above includes the coupling via transformer T2 of a loudspeaker circuit 30 having the requisite receiving and transmitting amplifiers and associated circuitry and loudspeaker 32, to a branch network connected in parallel to the transmission circuit. The branch network includes diodes 33, 35, resistor 34, hookswitch contact 12 and common switch contact 24. A mode selection switch comprising of contact 31 is connected in parallel across hookswitch contact 13 and is manually selectable to complete an electrical path to the ring lead of the subscriber line when the speaker mode is selected.

It should be understood that hookswitch contacts 11, 12 and 13 are controlled by a typical hookswitch mechanism which is manually operable into an operated or "off-hook" condition i.e. when the handset is lifted off the subscriber station or non-operated when "on-hook", i.e. when the handset is placed on the subscriber station. Further to avoid momentary open loop conditions, contacts 11 and 12 operate in a make-before-break fashion sequentially.

A detailed description of the operation of the improved loudspeaking telephone circuit will be hereinafter described in detail. It should be noted that the included drawing shows all contacts in their unoperated conditions.

When the loudspeaking subscriber station is intended to be used in the handset mode the subscriber lifts the receiver which places the substation "off-hook" thus allowing contact 11 to make connecting the transmission network in parallel with loudspeaker circuit 30. Contact 12 breaks next, disconnecting the speaker branch from the transmission circuit. Contact 13 makes last, supplying loop current from the central office battery to the transmission network via diode bridge 10 and thus completing the loop circuit.

The voltage at the cathode of diode 33 is negative with respect to the voltage at the cathode of diode 35, hence, diode 35 is reverse biased thus preventing any loudspeaker signal from modulating the telephone line. Diode 33 is used for long loops, low current, where the voltage drop across winding 48 of transformer T1 is less then the peak voltage being transmitted from the loudspeaker circuit. This insures the reverse bias integrity of diode 35. With the subscriber station now in the handset mode DTMF tone signalling is accomplished by manually operating tone signal generator 20 which breaks common switch contact 21 allowing register 26 to mute receiver R and breaking contact 25, removing transmitter T and diode 35 from the active circuit. Common switch contacts 22, 23, 24 have no effect on the active circuit when in the handset mode. Tones generated by tone generator 20 are outputted via the transmission circuit and the subscriber line to the central office.

Transfer from the handset mode to the speaker mode is accomplished by first manually selecting the speaker mode with a speaker mode switch (not shown) which makes contact 31, and then placing the handset "on-hook". Responsive to the placement of the handset contact 13 breaks first, allowing contact 31 to maintain loop current to the transmission circuit. Contact 12 makes next placing the loudspeaking circuit 30 in parallel with the transmission circuit. Normally this would allow an acoustic feedback condition and self-oscillation between loudspeaker 32 and transmitter T, however, diode 35 becomes forward biased at this time shunting current away from transmitter T. Contact 11 breaks last removing the transmission circuit from the current loop, maintaining the loop circuit through diode 33 and transformer T2.

Signalling in the speaker mode requires that the transmission network be temporarily switched into operation to regulate the DTMF tone level transmitted to the central office. When tone generator 20 is manually operated common switch contacts 22 and 21 break to mute the signalling tones to speaker 32 and receiver R respectively. Contact 23 makes placing the transmission network in parallel with speaker circuit 30. Diode 35 again becomes forward biased preventing the self-oscillation condition between transmitter T and loudspeaker 32. Contact 24 breaks removing part of the speaker load while still maintaining a path through resistor 34 for signalling tones to the loudspeaker. Contact 25 breaks last removing transmitter T and diode 35 from the active circuit. Signal tones outputted by tone generator 20 are regulated by the transmission circuit and sent to the central office via contacts 23 and 31 and the subscribers line.

The present invention has been described with reference to a specific embodiment thereof, for the purpose of illustrating the manner in which the invention may be used to advantage, it will be appreciated by those skilled in the art that the invention is not limited thereto. Accordingly any and all modifications, variations or equivalent arrangements which may occur to those skilled in the art should be considered to be within the scope of the invention.

What is claimed is:

1. An improved loudspeaking substation circuit for use in a telephone system, said telephone system including a central office with a central office battery, a subscriber line connected to said central office, said battery and to a loudspeaking substation, said substation including a transmission circuit having a transmitter, a manually operable signal generator including first and second switching means arranged to operate when said signal generator is operated, and a hookswitch including first and second contacts connecting said substation and said transmission circuit respectively to said subscriber line in response to manual operation of said hookswitch, completing a loop circuit extending over said subscriber line for transmission of battery current of said substation, and dialing signals to said central office when said signal generator is operated, said improvement comprising:

shunting means manually selectable to provide an alternate path for completing said loop circuit;

a loudspeaking circuit coupled to said subscriber line and said transmission circuit including current steering means and a third hookswitch contact, said third contact arranged to connect said loudspeaking circuit to said transmission circuit for completing said loop circuit through said loudspeaking and transmission circuits when said hookswitch is unoperated, and said current steering means steering said battery current around said transmitter prior to release of said second hookswitch contact for disconnecting said transmission circuit from said loop circuit and maintaining said loop circuit to said central office through said loudspeaking circuit; and said signal generator when manually operated connecting said transmission circuit via said first switching means to said loop circuit and said second switching means disconnecting said transmitter from said transmission circuit, whereby said dialing signals are transmitted to said central office.

2. An improved loudspeaking substation circuit as claimed in claim 1, wherein: said signal generator first and second switching means are electrical contacts under mechanical control of said signal generator and operated only when said signal generator is operated.

3. An improved loudspeaking substation circuit as claimed in claim 1, wherein: said shunting means is an electrical contact connected in parallel across said first hookswitch contact operable to connect said substation to said subscriber line when said hookswitch is unoperated.

4. An improved loudspeaking substation circuit as claimed in claim 3, wherein: said loudspeaker circuit is inductively coupled to said transmission circuit via a branch network including said steering means and said third hookswitch contact, and said steering means comprises a first diode connected in parallel across said transmitter and normally reversed biased, and forward biased shunting said battery current around said transmitter when said third hookswitch contact connects said branch network to said transmission circuit.

5. An improved loudspeaking substation circuit as claimed in claim 4, wherein: said branch network further includes a second diode connected in series to said first diode maintaining the reverse bias integrity of said first diode.

* * * * *